May 18, 1965 A. H. CROWTHER 3,184,058
SPECTACLE SALES DISPLAY
Filed Oct. 24, 1963 2 Sheets-Sheet 1

INVENTOR.
ARTHUR H. CROWTHER
BY *Robertson and Youtie*
ATTORNEYS

May 18, 1965 A. H. CROWTHER 3,184,058
SPECTACLE SALES DISPLAY
Filed Oct. 24, 1963

INVENTOR.
ARTHUR H. CROWTHER
BY Robertson and Voutie
ATTORNEYS

United States Patent Office 3,184,058
Patented May 18, 1965

3,184,058
SPECTACLE SALES DISPLAY
Arthur H. Crowther, Meadowbrook, Pa., assignor to Bachmann Bros., Inc., Philadelphia, Pa., a corporation of Pennsylvania
Filed Oct. 24, 1963, Ser. No. 318,689
3 Claims. (Cl. 206—79)

This invention relates generally to sales displays, and is especially concerned with a unique point-of-purchase display for use with spectacles, including sunglasses, and the like.

It is an important object of the present invention to provide a sales display for spectacles, which neatly and attractively presents spectacles to the view of prospective purchasers, and facilitates quick and easy selection, removal and replacement of spectacles with respect to the display by the purchaser, to provide an effective self-service display.

It is a further object of the present invention to provide a sales display of the type described which is adapted to removably retain in displayed condition a large number of spectacles while occupying relatively little space, and to esthetically present a wide variety of sizes and styles of spectacles which may be readily removed and replaced without regard to original location, the spectacle-holding structure of the instant invention accommodating substantially all types of spectacles from kiddies' to large men's sizes.

It is a more particular object of the present invention to provide a spectacle display card having the advantageous characteristics mentioned in the preceding paragraphs which is extremely simple and economical an manufacture, highly attractive in use, and wherein spectacles may be conveniently removed and replaced by a mere manual pull and push, respectively, which operations automatically open and close the spectacle temples, whereby the spectacles are ready for wear upon removal and folded or closed for effective retention upon replacement on the card.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
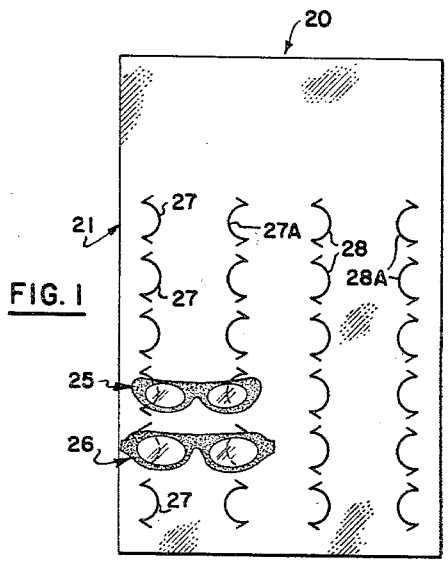
FIGURE 1 is a front elevational view showing a spectacle display of the present invention, certain of the spectacles having been removed therefrom.
Figure 2:
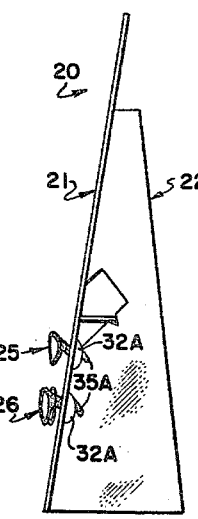
FIGURE 2 is a side elevational view of the display of FIGURE 1.

Referring now more particularly to the drawings, and specifically to FIGURES 1 and 2 thereof, a spectacle display or stand is there generally designated 20, and includes a generally upstanding card 21, on the rear side of which is a support 22 maintaining the card in its upstanding position.

The card may be of any suitable outline configuration, being shown as rectangular for purposes of illustration, and may be fabricated of any suitably stiff, resilient sheet material, such as paperboard, card stock, or the like, including plastics if desired. The support 22 may be of conventional design and collapsible to a folded condition in facing engagement with the rear side of the card 21. As shown in FIGURES 1 and 2, several spectacles have been removed from the display card 21, to better expose the card in the drawings.

Figure 3:
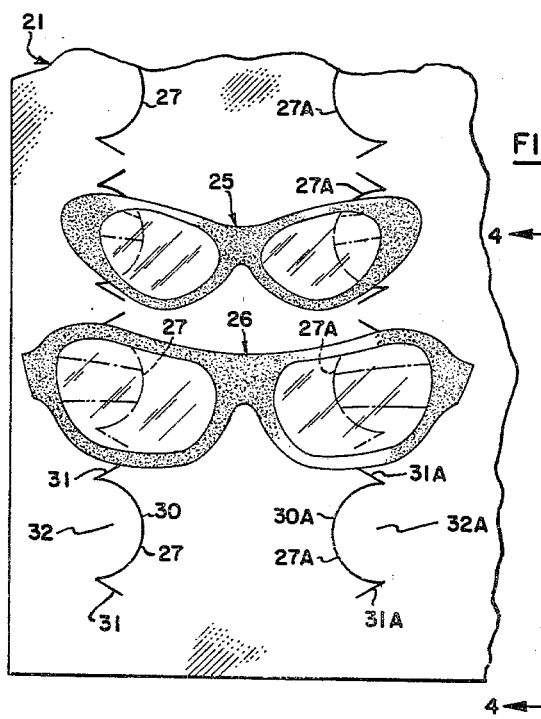
FIGURE 3 is an enlarged fragmentary front elevational view of the display of FIGURES 1 and 2.
Figure 4:
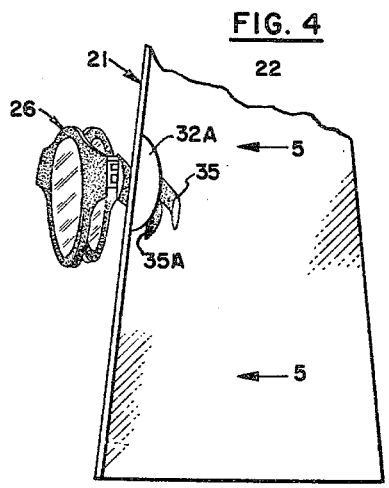
FIGURE 4 is a side elevational view, somewhat enlarged, taken generally along the line 4—4 of FIGURE 3.
Figure 5:
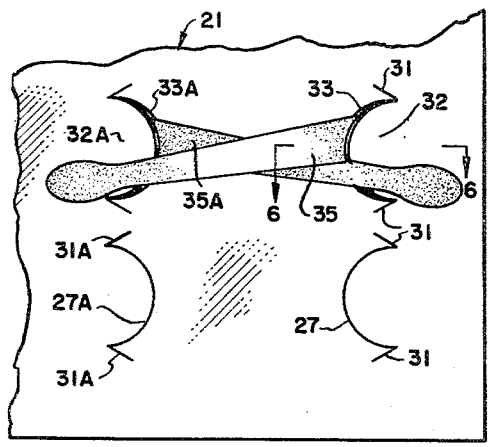
FIGURE 5 is a rear elevational view taken generally along the line 5—5 of FIGURE 4.
Figure 6:
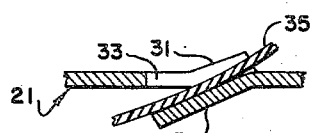
FIGURE 6 is a fragmentary sectional view taken generally along the line 6—6 of FIGURE 5, with the spectacles removed.

In FIGURE 3 a portion of the card 21 is shown carrying a pair of spectacles 25 and 26, the former being relatively small ladies' spectacles, and the latter being relatively large men's spectacles.

The card 21 is formed with several generally vertical rows of cuts, the cuts of each row being respectively designated 27, 27a, 28 and 28a. The cuts of rows 27 and 27a are respectively arranged in laterally spaced pairs, as are the cuts of rows 28 and 28a. All of the cuts 27, 27a, 28 and 28a may be substantially identical, if desired, and the cuts of each laterally spaced pair are advantageously arranged in facing relation or of opposite hand.

Referring now to FIGURES 3–6, wherein the cuts 27 and 27a are shown in enlarged scale, it will be observed that cuts 27 and 27a are each of a generally U-shaped configurtion, and the cuts of each pair arranged with their hollow or concave sides facing away from each other. More particularly, each cut 27 includes an arcuate, generally semicircular main portion 30, having its concave or inner side facing laterally outward away from the opposite cut 27a, while the latter includes an arcuate, generally semicircular main portion 30a having its concave side facing laterally outward away from the arcuate portion 30. At each end of the arcuate cut portion 30 is a terminal cut portion or extension 31. The terminal portions 31 extend from respective upper and lower ends of each arcuate portion 30, and may be substantially straight, as shown. The upper terminal portion 31 extends from the upper end of arcuate cut portion 30 generally obliquely upward and laterally inward, while the lower terminal cut portion 31 extends from the lower end of the arcuate cut portion 30 generally obliquely downward and laterally inward. Thus, the terminal cut portions 31 of each cut 27 extend generally obliquely away from each other and laterally inward or toward the opposite cut 27a.

Similarly, from the upper end lower extremities of arcuate cut portion 30a, there extend terminal cut portions or extensions 31a, which extend generally obliquely away from each other and laterally inward toward the cut 27. Each laterally spaced pair of cuts 27 and 27a may thus be identical, but inverted or opposite in hand; and, the the arcuate cut portions 30 and 30a may each define of the card material therewithin a generally semicircular tab or finger, as at 32 and 32a, respectively. The tabs 32 and 32a extend laterally toward and terminate short of each other.

By reason of the inherent stiffness and resilience of the card 21, the tabs 32 and 32a are resiliently deflectable out of the plane of the remainder of the card to provide a pair of laterally spaced openings through the card. One such opening is shown at 33 in FIGURE 6.

Figure 7:
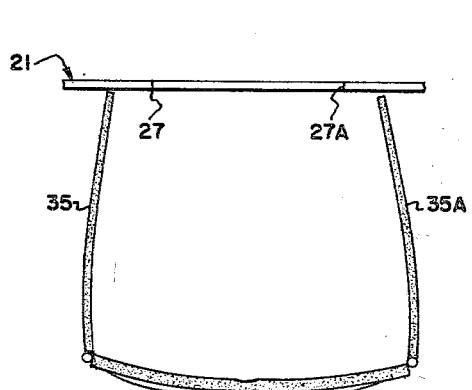
FIGURE 7 is a top plan view illustrating an initial stage of placement of spectacles in the instant display.
Figure 8:
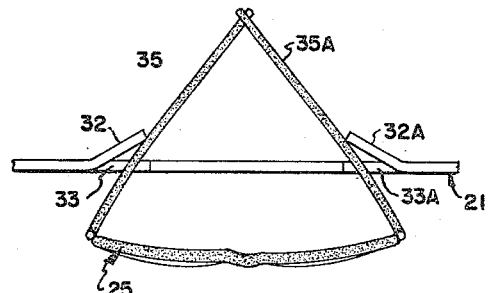
FIGURE 8 is a top plan view similar to FIGURE 7, showing a slightly later stage in the placement of spectacles on the display.
Figure 9:
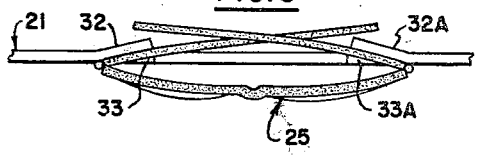
FIGURE 9 is a top plan view showing the spectacles in position on the display.

In operation, a pair of spectacles 25, see FIGURE 7, with its temples 35 and 35a swung rearward to open position, may be moved rearwardly to engage the temples with respective tabs 32 and 32a. The tabs are resiliently deflected rearward, see FIGURE 8, to provide openings 33 and 33a respectively receiving the temples 35 and 35a for rearward insertion through the openings of the temples. Upon continued rearward movement of the spectacles 25, the resilient engagement of the tabs 32 and 32a with the temples 35 and 35a serves to swing the latter forward to a closed position, as shown in FIGURE 9. In this closed position, the tabs 32 and 32a frictionally engage with respective temples 35 and 35a to retain the spectacles 25 in closed condition and properly positioned relative to the card 21. Of course, mere forward withdrawal of the spectacles 25 from the condition of FIGURE 9 effects automatic opening and removal of the temples 35 and 35a from the card.

While the main cut portion 30 defines the tab 32, the extension cuts 31 permit of increased deflection of the tab within its elastic limit, while permitting accommodation of heavier or thicker temples without requiring a larger opening 33. That is, the extension cuts 31 facilitate reception of heavier temples, while the temple-receiving opening 33 is effectively limited to the length of cut 27. Hence, both relatively heavy and relatively light temples are frictionally retained in position by the instant construction.

From the foregoing, it is seen that the present invention provides a sales display for spectacles which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A spectacle sales display comprising a stiff resilient card having front and rear sides, said card having a pair of aligned spaced generally U-shaped cuts arranged with their concave sides facing oppositely away from each other, the card material bounded within each cut defining a tab resiliently deflectable rearwardly out of the plane of said card to form a through opening, and spectacles including a pair of temples mounted on the front side of said card, each of said temples extending through one of the openings and being engaged rearwardly by one of the resiliently deflectable tabs, whereby the temples are resiliently biased by said tabs toward the rear side of said card and are removably retained in closed position on said card.

2. A spectacle sales display according to claim 1, said U-shaped cuts each having a pair of terminal portions extending obliquely away from each other and in the direction toward the other cut, for increased tab deflection without increasing the effective area of the opening.

3. A spectacle sales display according to claim 2, said cuts each being generally symmetrical about a center line through said pair of cuts.

References Cited by the Examiner
UNITED STATES PATENTS

| | | | |
|---|---|---|---|
| Re. 4,162 | 10/70 | Hart | 206—79 |
| Re. 21,592 | 10/40 | Addis | 206—45.19 |
| 1,215,402 | 2/17 | Owens | 206—79 |
| 1,887,270 | 11/32 | Krieg | 206—45.19 |
| 2,043,070 | 6/36 | Rutkowski | 211—72 |
| 2,224,027 | 12/40 | Tate | 206—79 |
| 2,656,918 | 10/53 | Hollis | 206—79 |
| 3,133,637 | 5/64 | Siegler | 206—65 |

THERON E. CONDON, *Primary Examiner.*

LOUIS G. MANCENE, *Examiner.*